E. B. STUART.
TYPEWRITING MACHINE.
APPLICATION FILED JUNE 6, 1918.

1,366,137.

Patented Jan. 18, 1921.
9 SHEETS—SHEET 6.

Witnesses
Martin H. Olsen

Inventor
Edwards B. Stuart
By Rummler & Rummler
Attys

E. B. STUART.
TYPEWRITING MACHINE.
APPLICATION FILED JUNE 6, 1918.

1,366,137.

Patented Jan. 18, 1921.
9 SHEETS—SHEET 7.

E. B. STUART.
TYPEWRITING MACHINE.
APPLICATION FILED JUNE 6, 1918.
1,366,137.
Patented Jan. 18, 1921.
9 SHEETS—SHEET 8.
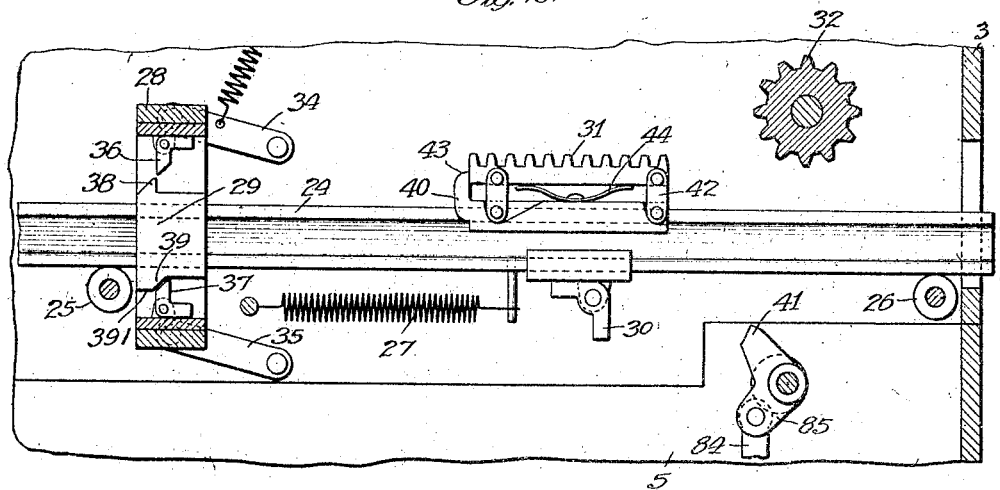
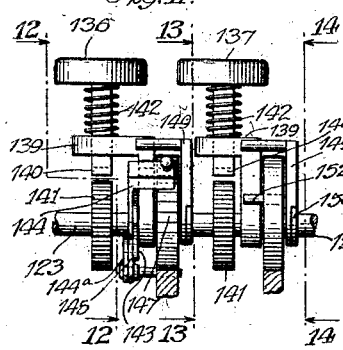
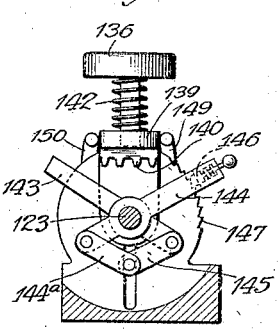
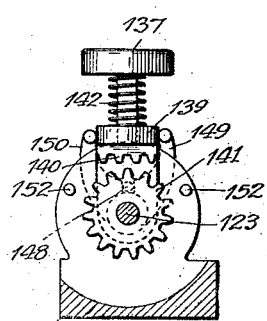
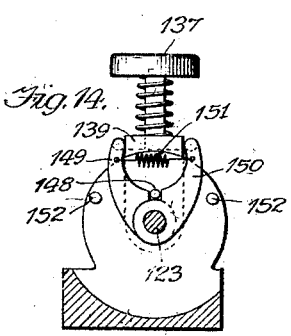
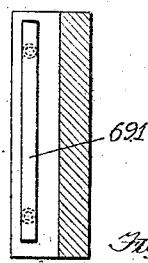
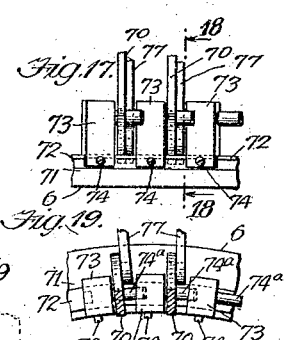
Witnesses
Martin H. Olsen
Inventor
Edward B. Stuart
By Ammuler & Ammuler
Atty's E. B. STUART.
TYPEWRITING MACHINE.
APPLICATION FILED JUNE 6, 1918.
1,366,137.
Patented Jan. 18, 1921.
9 SHEETS—SHEET 9.
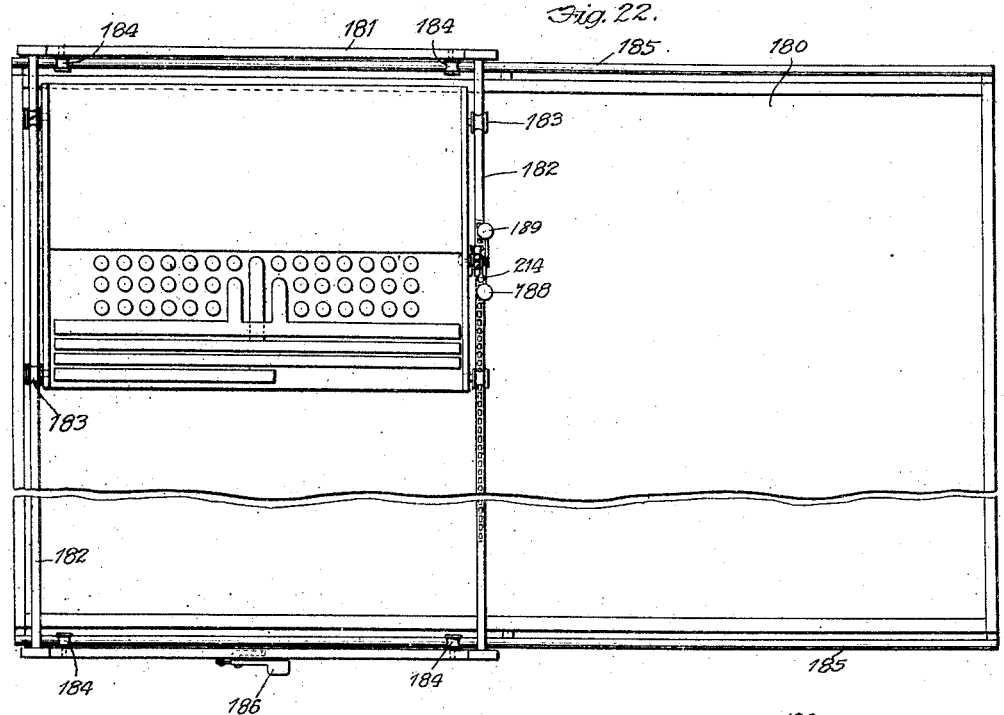
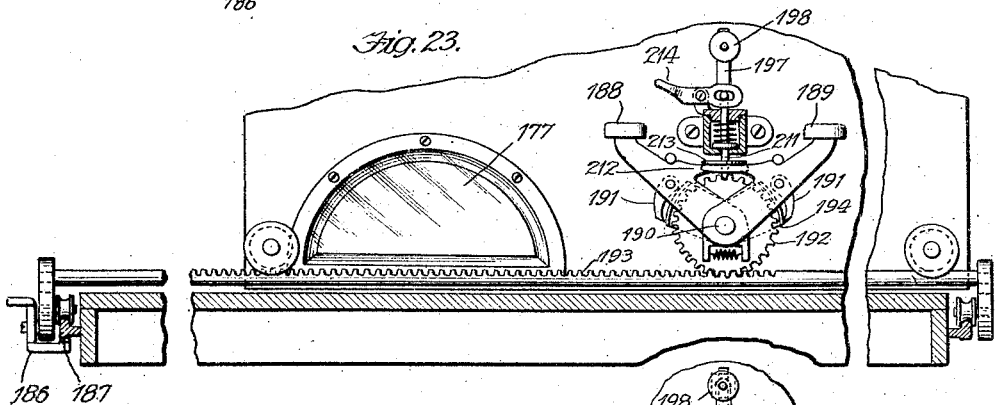
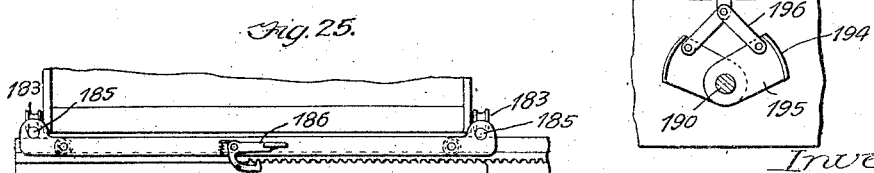
Witnesses
Martin H. Olsen.
Inventor
Edward B. Stuart
By Ammler & Ammler
Attys

UNITED STATES PATENT OFFICE.

EDWARDS B. STUART, OF CHICAGO, ILLINOIS.

TYPEWRITING-MACHINE.

1,366,137.  Specification of Letters Patent.  Patented Jan. 18, 1921.

Application filed June 6, 1918. Serial No. 238,491.

*To all whom it may concern:*

Be it known that I, EDWARDS B. STUART, a citizen of the United States of America, and a resident of Chicago, county of Cook, and State of Illinois, have invented certain new and useful Improvements in Typewriting-Machines, of which the following is a specification.

The objects of this invention are to provide many structural improvements in typewriters with the end in view to eliminate undesirable features in typewriter constructions which from the operator's viewpoint are needlessly troublesome in their action, such as the vibrations set up in the mechanism, for instance due to the escapement devices, the possibility on rapid manipulation of the keyboard to cause the type bars to interfere with each other's action, the key construction which makes imperative the release of one key before the next is depressed, the possibility of simultaneously depressing a plurality of keys, and the absence of convenient means for differential back spacing, particularly without setting up annoying vibrations in the mechanism.

An illustrative embodiment of the invention is shown in the accompanying drawings, in which—

Fig. 10 is a detail in side elevation showing key locks, type bar actuating devices, and the means for producing a relative shift between the platen and the type bar basket.

Figure 8:
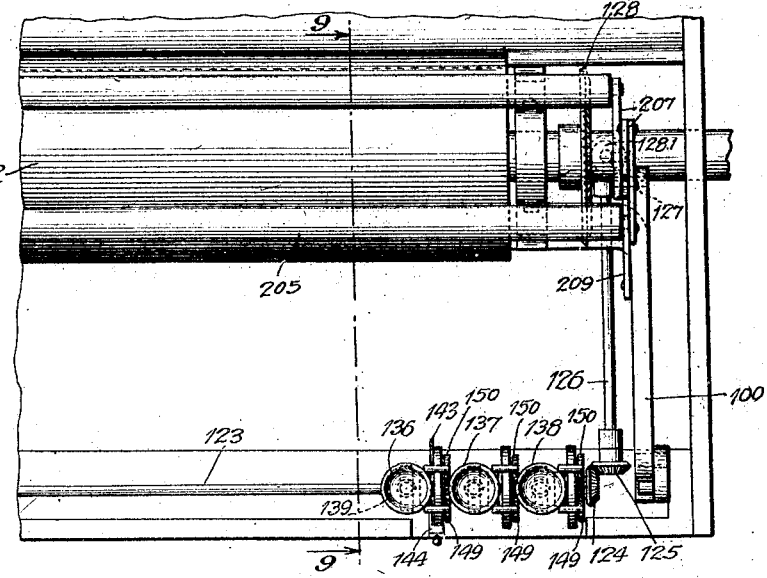
Fig. 8 is a plan view showing gearing connecting the line spacing mechanism shown in Fig. 6 with the platen, and includes a plan view of keys for forward and backward line spacing of variable extents.

Figs. 11, 12, 13, and 14 are details of the forward and backward line spacing keys shown in Fig. 8.

Figure 3:
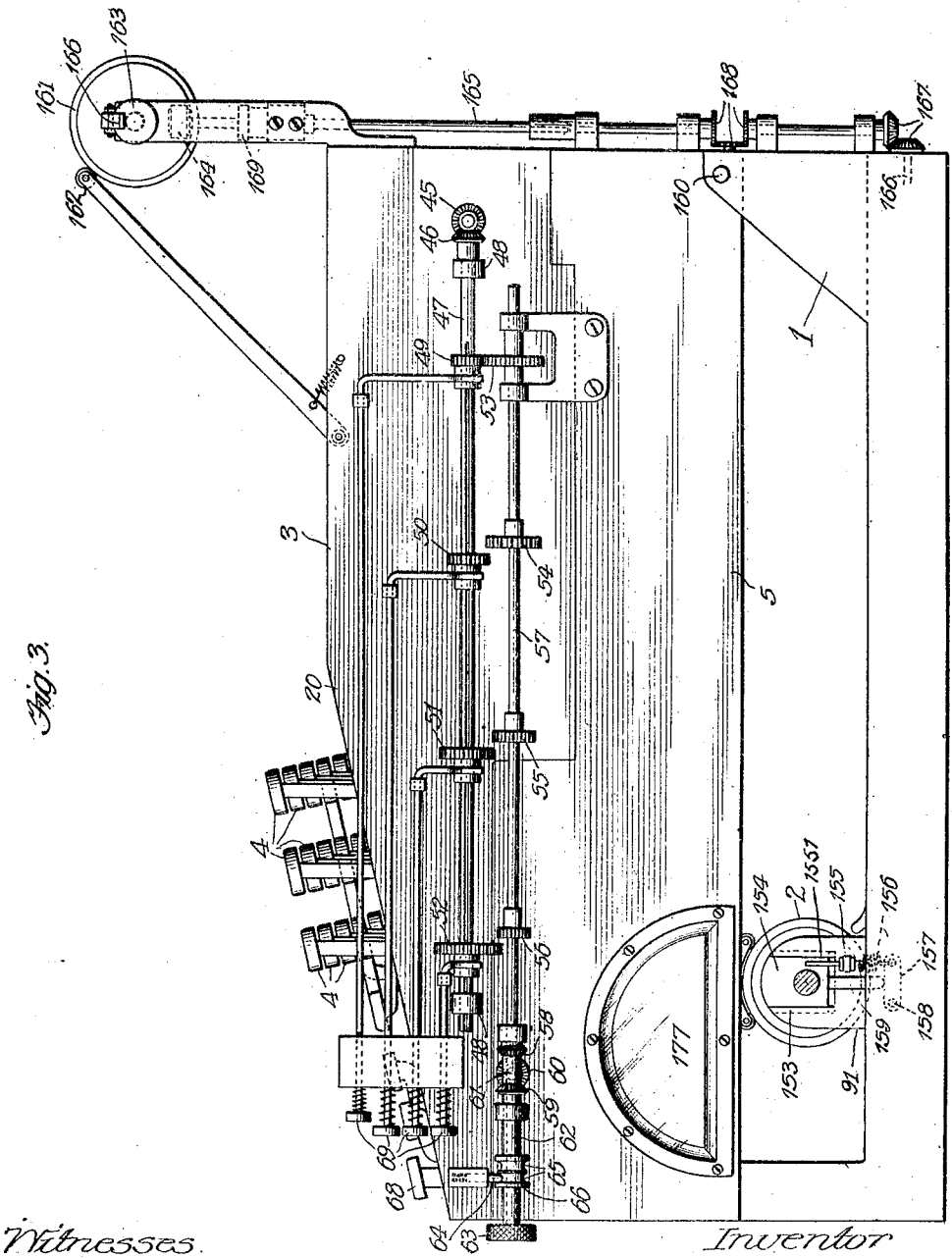
Fig. 3 shows the machine in side elevation.

Figs. 15 and 16 are details of the detent for gear shifting keys 69 (Fig. 3).

Figs. 17, 18, and 19 are details showing the method of attachment of the type bars to the basket frame.

Figs. 20 and 21 are details of a latchable case shift key.

Fig. 22 shows a frame structure including a flat platen over which the typewriter is adapted to be shifted in two directions so that it may write at any point on a comparatively large sheet.

Fig. 23 is a fragmentary detail in side elevation showing means for shifting the typewriter forwardly and backwardly by step-by-step movements along a frame shown in Fig. 22.

Fig. 24 is a fragmentary detail of an adjustable device for controlling the spacing mechanism shown in Fig. 23.

Fig. 25 is a detail in front elevation of the alining mechanism shown in Fig. 22.

The objects of the invention are accomplished by the general arrangement of mechanism shown in the drawings. This arrangement consists of three principal units, the base of the machine supporting a stationary platen as one unit, a keyboard mechanism as the second, and a third unit located between the keyboard and the platen-supporting base and comprising a reciprocating type basket, each of the type being arranged to receive motion from rockers extending from side to side of the machine and in turn adapted to be actuated by the keyboard mechanism. Each key is adapted to transmit motion directly to the type basket in order to move the latter relatively of the platen preliminary to each impression. The means for shifting the type basket includes a rotatable shaft having threaded engagement with the type basket and arranged to be rotated upon the depression of any of the writing keys or the space keys.

As shown in Fig. 3, the frame of the machine comprises three separable parts, a base 1, which supports the platen 2, an upper section 3 in which the keys 4 are pivotally mounted, and an intermediate section 5 within which the type carriage 6 is slidably mounted.

Figure 1:
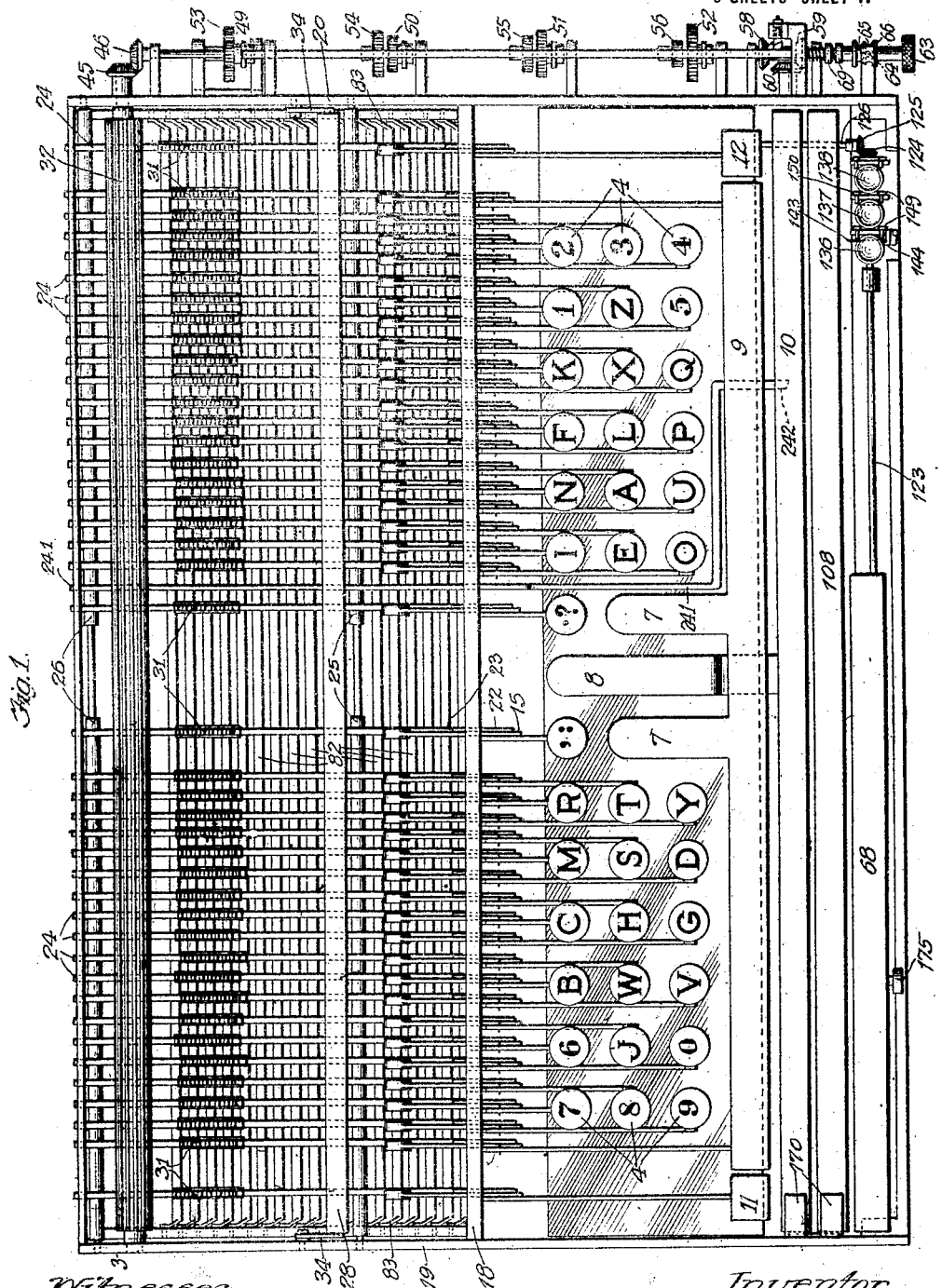
Figure 1 is a plan view of a typewriting machine constructed according to this invention.
Figure 4:
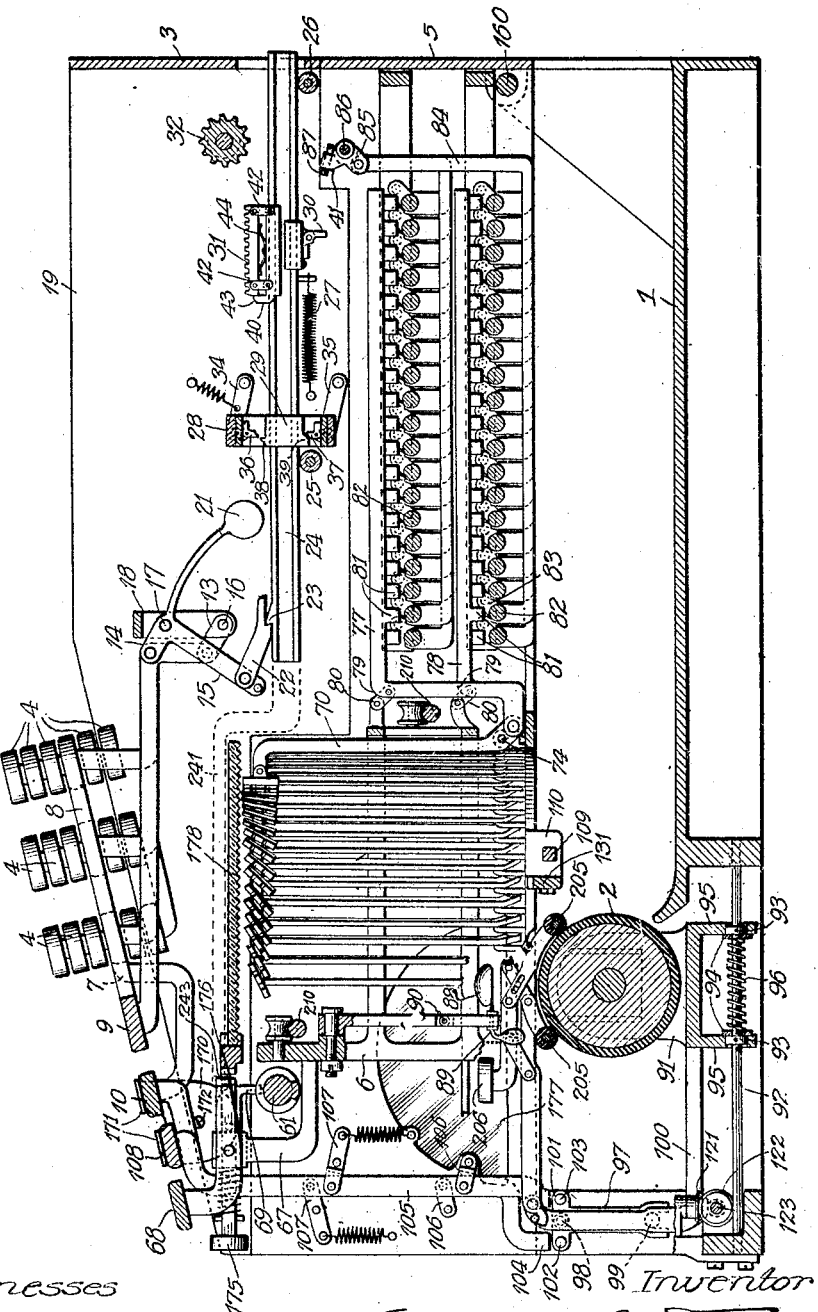
Fig. 4 shows the machine in longitudinal vertical section.

The key arrangement is shown in Fig. 1. The printing keys are arranged in right and left-hand groups between projections 7 and 8 on a spacing key 9 and a case shift key 10. The key 9, together with keys 11 and 12, has connections the same as the keys 4 for shifting the type basket, but for shifting the basket different distances. These connections are shown in Fig. 4. All of the above-mentioned keys are pivoted at their rear ends on the forward end of a link 13 and the arm 14 of the bell crank lever 15. The links 13 and bell crank levers 15 are in turn pivoted by pins 16 and 17 to the frame structure 18 extending from side to side of the side plates 19 and 20 of the section 3 of the main frame of the machine. There is one bell crank lever 15 for each key, and it carries a counterweight 21 for restoring a depressed key upon its release. Each bell crank lever also carries pivoted thereto at its lower end a pawl 22 for engaging a shoulder 23 on the bar 24. The bar 24 is slidably mounted on guides 25 and 26, and when a key is depressed the corresponding bar 24 is shifted rearwardly against the action of its restoring spring 27. Each bar coöperates with a key lock 28 by means of a toothed adjustable block 29 carried by the bar, and each bar likewise carries a pawl 30 for imparting motion to the corresponding type bar actuating device, and each bar 24 also supports a rack 31 for engaging and rotating a pinion rod 32 which has a gear connection with the type basket frame 6 for the purpose of effecting the step by step motion of the type basket with respect to the platen 2.

The key lock 28 consists of a narrow rectangular frame supported on the side frames 19 and 20 by pivoted parallel links 34 and 35. These frames carry above and below the bars 24 wide pawls 36 and 37 which extend across all of the bars 24. The blocks 29 carried by each bar have teeth 38 and 39 for respectively coöperating with the pawls 36 and 37. Upon the initial depression of any key, the tooth or shoulder 39 on the block 29 of the corresponding bar 24 engages pawl 37, rocking the key lock frame 28 downwardly, thus causing the pawl 36 to move to the rear of the teeth 38 of all the remaining bars 24, preventing rearward motion of any of said bars until the shoulder 39 of block 29 of the one which has been moved passes to the rear of the pawl 37 or is permitted to return to normal position under the action of its spring 27. With this construction, all of the keys of the keyboard are locked against motion for part of the time when one of the keys is being depressed, but only while the surface 391 of block 29 rides over the pawl 37 (Fig. 10).

The surfaces 391 of the blocks 29 may be longer or shorter if it is desired to lock the keys against depression a different length of time than that provided by the blocks 29 as shown in the drawings.

One of these blocks on the reciprocating bar 241 (Fig. 1) serves to lock all the writing keys against depression as the carriage 6 nears the end of its travel to the right of the machine. The bar 241 is beveled at its forward end 242 and is engaged at its beveled end and forced rearwardly by the beveled end 243 of the supporting arm 244 (Fig. 5) of key 68, when carriage 6 reaches right-hand position.

If the operator desires to continue to write a few letters after the keyboard is thus locked, it is necessary to depress the key 68 (Fig. 4) for the purpose of causing the beveled portion 243 to rise above the beveled end 242 of the bar 241.

Figure 2:
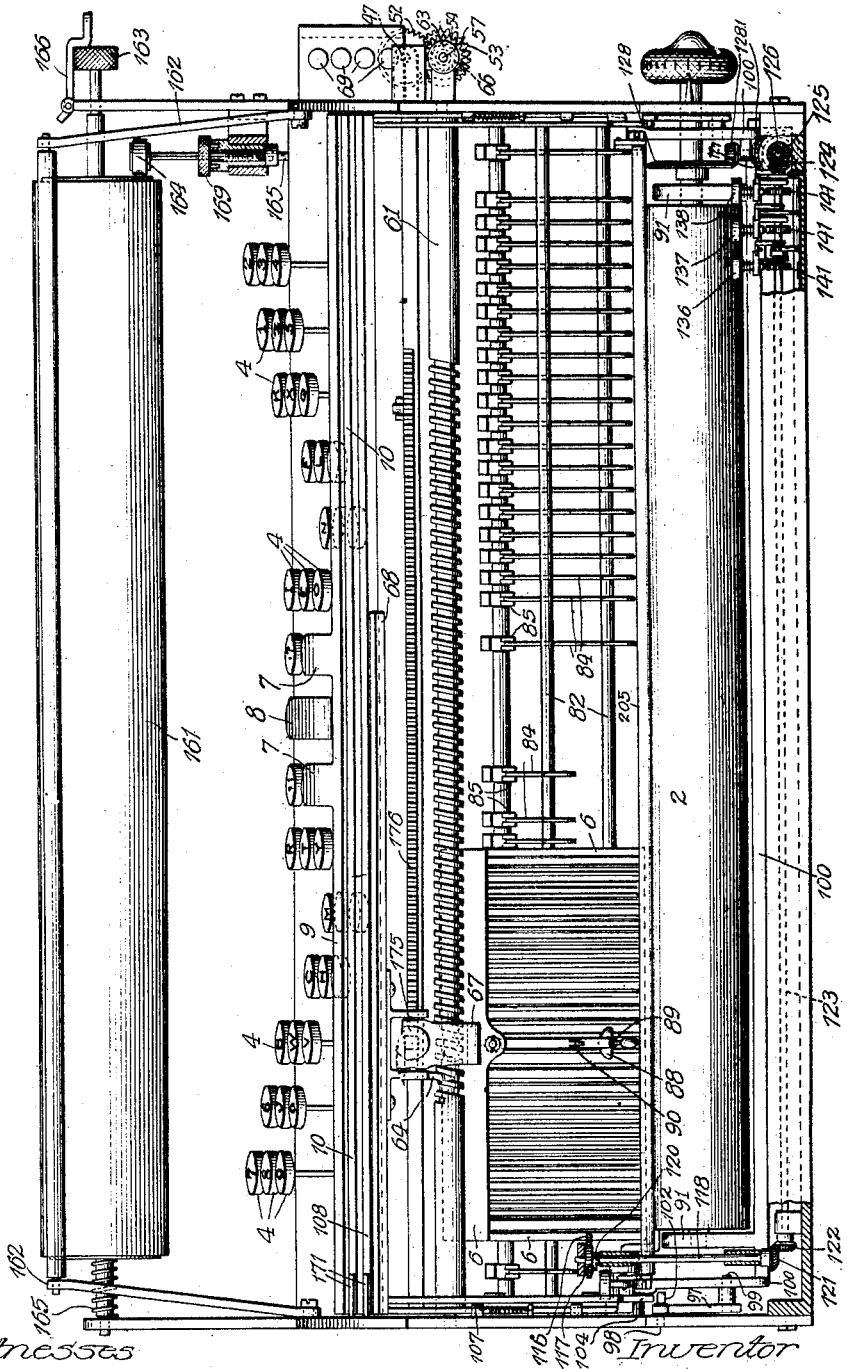
Fig. 2 shows a front elevation of the machine.

The racks 31 for transmitting motion from the keys to the type carrying basket are mounted on members 40 adjustable along the bars 24 in order that they may be set to engage and drive the pinion rod 32 either before or after the pawl 30 strikes the type actuater 41. The racks 31 are connected to the members 40 by links 42, but are prevented from rocking forwardly around the pivots between the links and the member 40 by a shoulder 43 on the latter member. The racks 31 are held in their upper positions by the springs 44. These springs permit the racks to ratchet over the teeth of the pinion bar 32 on the return motion of the bars 24. The pinion rod 32 as shown in Figs. 1 and 3 carries fast at its right-hand end a beveled pinion 45 meshing with a pinion 46 fast to an intermediate shaft 47 rotatably mounted in the fixed bearings 48. The shaft 47 supports a plurality of pinions 49, 50, 51, and 52 of different sizes. These pinions are feathered to the shaft so as to rotate therewith but to be independently movable longitudinally of the shaft in order that different ones may be meshed with companion pinions 53, 54, 55, and 56 fast to the shaft 57. Feathered to shaft 57 are a pair of opposed beveled pinions 58 and 59, one or the other of which may be meshed with the pinion 60 on the transverse shaft 61. The pinions 58 and 59 are rigid with a sleeve 62 slidable along the shaft 57 by means of the knurled head 63. The sleeve is retained in set position by the spring plunger 64 engaging grooves 65 in a collar 66 fast to the sleeve. The shaft 61 as shown in Fig. 2 is threaded and constitutes a worm drive for the type basket frame 6.

The frame 6 shown in Fig. 4 has a forward-projecting arm 67 to which is pivoted the key 68. A rearward arm 69 of the key 68 has toothed engagement with the threaded shaft 61. Accordingly when the shaft 61 is rotated, the type basket and the key 68 carried thereby are shifted laterally with respect to the platen. The direction of motion of the type basket is determined by which of the beveled pinions 58 or 59 (Fig. 3) is in engagement with the pinion 60. The different beveled pinions 49 and 52 are selected and meshed with their companion pinions by depressing one of the keys 69 (Fig. 3), these keys having bent shanks which are forked over the grooved hubs of the collars of gears 49 to 52, for the purpose of sliding their respective pinions into and out of mesh with the companion pinions on shaft 57. The keys 69 are depressible against the action of springs and coact with a spring detent 691 (Figs. 15 and 16) arranged to release one key upon the depression of another.

The type carrying frame may be shifted laterally in either direction any desired extent by rotating the knurled head 63. This means of adjusting the type carrying frame admits of greater accuracy than is possible from the step-by-step motion imparted to it by the depression of the writing keys.

Figure 5:
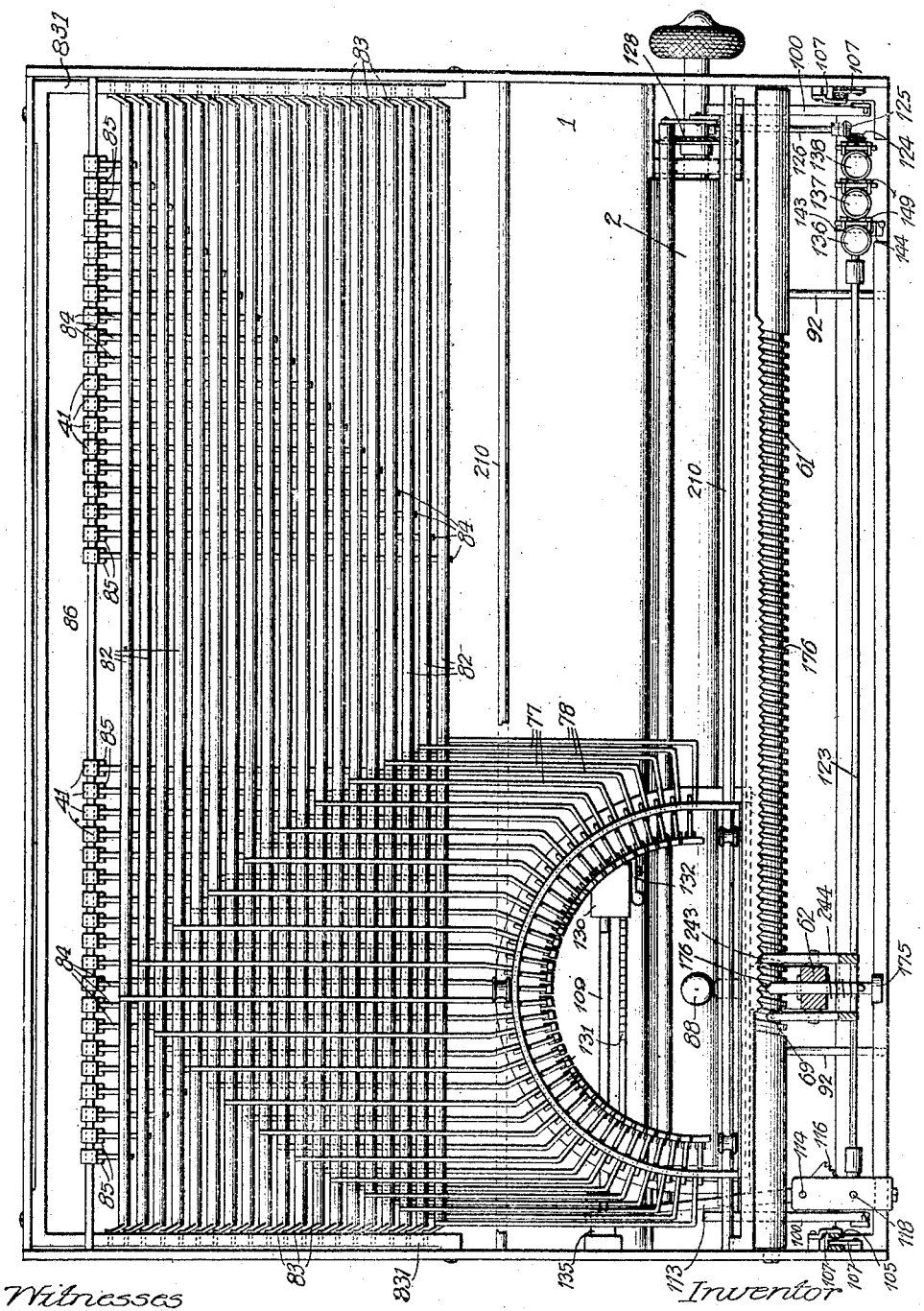
Fig. 5 is a plan view of the machine with the keyboard unit removed.

The method of mounting the type carrying bars 70 to the type carriage frame 6 is shown in Figs. 17 to 19. The semi-circular base portion 71 of the frame 6 is provided with a flange 72 to which individual bearing supports 73 for the type bars 70 are attached by set screws 74. Each type bar extends below its pivotal connection 74ª with the bearing member 73, at an angle to the part of the bar extending upwardly from said pivot and is thus in the form of a bell crank lever. The short lower arm of each type bar is pivotally connected to a rearwardly extending bar 77 or 78 (Fig. 4). The bent portions 79 thereof are hung from links 80 pivoted to the carriage frame 6 and of the same length as the shorter arms of the type bars 70. Each of the bars 77 and 78 has a shoulder 81 on its lower edge in position to be engaged by a vertically movable rod or yoke 82, and when so engaged a bar 77 or 78 will move upwardly without disturbing its horizontal setting due to its parallel link mounting. The yokes or bars 82 are provided with arms 83 at each end by means of which they are pivoted to the removable frames 831 (Fig. 5). An L-shaped arm 84 is attached to each bar 82 at one end and at the opposite end is attached to the lower arms 85 of the type-actuator bell cranks 41. The bell cranks 41 are loosely journaled on the fixed rod 86 and may be provided with the adjustable screws 87, as shown in Fig. 4, to regulate their rocking motion when engaged by the pawls 30. The pawls 30, as previously described, are reciprocated upon the depression of their respective writing keys 4 through the bell crank levers 41 and their connections to corresponding type carriers or type bars 70, and rock the type bars downwardly around their pivots 74 to make the impression. The type of each bar 70 in its down stroke wipes over a counterweighted ink pad 88 which is free to be pushed and oscillated out of the way of the type carrier by the motion around its pivots 89 and 90.

The platen 2 is removably supported on the platen frame 91 which is slightly slidable longitudinally of the typewriter along the rods 92 for effecting the case shift. The rods 92 each have a pair of fixed collars 93 at the outside of loose washers 94. These washers extend beyond the periphery of collars 93 so as to be engaged by the arms 95 of the frame 91 when this frame is shifted along the rods. The spring 96 bearing between the washers 94 serves to restore the frame 91 to its central position when it is released.

The means for shifting the frame 91 are shown in Fig. 4. This shifting means includes a lever 97 pivoted to the frame of the machine by the pin 98. The lever 97 at its lower end is forked over a pin 99 projecting from the side of a frame structure 100 secured to the frame 91. At its upper end the lever 97 has lateral extensions 101 carrying pins 102 and 103 opposite the lower ends 104 of vertically movable key shanks 105. These key shanks are supported by the pivoted links 106 and levers 107. The heads 10 and 108 of the key shanks 105 are located in convenient position on the keyboard, as shown in Fig. 1. The depression of keys 10 or 108 through the mechanism just described effects the desired case shift of the platen 2 either forwardly or rearwardly. Either of these keys may be depressed and retained in depressed position by the key 170 (Figs. 20 and 21). The key 170 has flanges 171 projecting over keys 10 and 108, and when it is rocked around its pivot 172 it causes the depression of one or the other of keys 10 or 108. The key 170 is held in adjusted position by the resilient latch 173.

Figure 6:
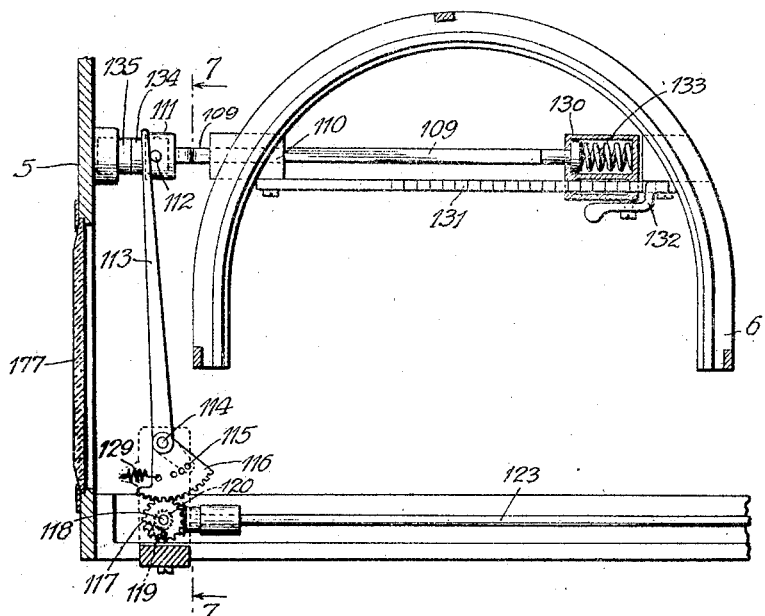
Fig. 6 is a detail in plan of the automatic line spacing mechanism.
Figure 7:
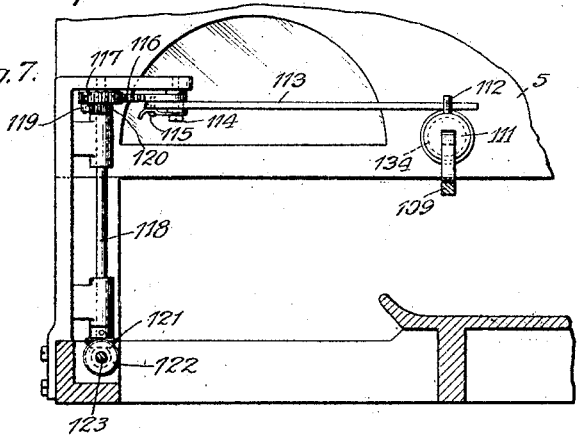
Fig. 7 is a front view of the automatic line spacing mechanism.
Figure 9:
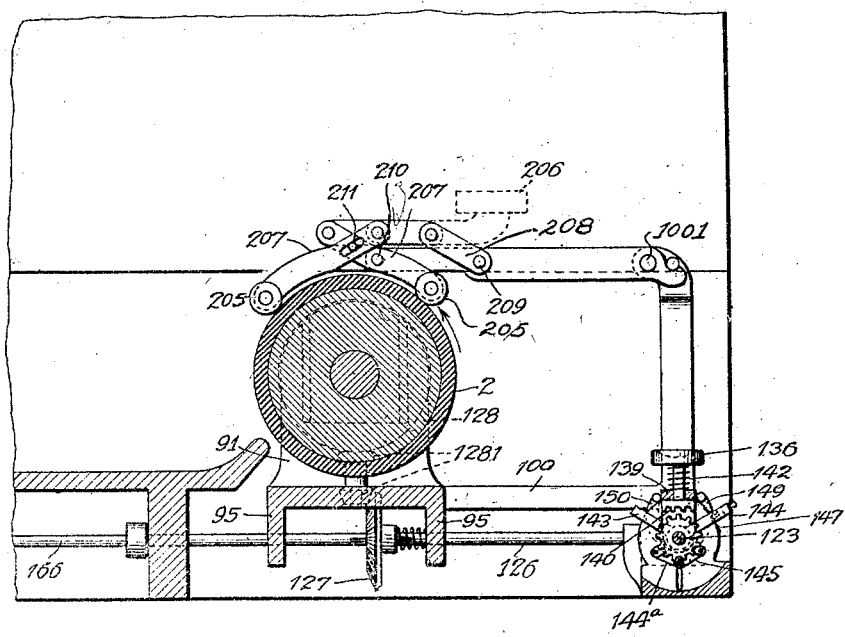
Fig. 9 is a sectional detail on the line 9—9 of Fig. 8.

The platen is automatically rotated for the purpose of line spacing when the type carriage 6 is restored to its left-hand position (Fig. 2). The mechanism for accomplishing the automatic line spacing is shown in Figs. 6 and 7. The carriage 6 carries a rod 109 slidably mounted in the bearings 110. This rod has a collar 111 at its left end carrying a pin 112. Upon the restoring of the carriage, the pin 112 engages the end of a lever 113 which rocks on the fixed pivot 114. It is adjustably secured by a spring-pressed pin 115 to a segment gear 116. The segment gear meshes with a pinion 117 loose on the vertical shaft 118 and carrying a pawl 119 engaging a ratchet wheel 120 fixed to the shaft 118. This shaft carries fast a beveled pinion 121 in mesh with a pinion 122 fast to the horizontal shaft 123. The shaft 123 at its right-hand end (Fig. 2) carries a pinion 124 meshing with another pinion 125 on the shaft 126 (Fig. 8). This shaft carries the pinion 127 meshing through intermediate pinions 1281 with beveled gear 128 fast to the platen 2. Pinion 127 is feathered to the shaft 126, as shown in Fig. 9, so that it may move with the platen upon case shift operations. When the carriage 6 moves to the right again upon further operation of the machine, the spring 129 (Fig. 6) restores the lever 113 to its original position, the pawl 119 then idly riding over the ratchet wheel 120.

The rod 109 is adjustable for the purpose of regulating the left-hand margin of the sheet written upon. This adjustment is effected by shifting the rod 109 and a spring-holding cylinder 130 at the right-hand end of the rod with respect to the rack 131 fixed to the frame 6. The cylinder 130 carries a pivoted pawl 132 for engagement with the rack. The purpose of the spring 133 and cylinder 130 is to afford a cushion connection between the rod 109 and frame 6, and a restoring spring for the rod after the rod is shifted with respect to the frame. At its left-hand end the rod 109 carries a rubber cushion 134 in position to coact with a cushion or buffer 135 mounted on the inside of the frame 5.

Line spacing may be effected forwardly or backwardly by the keys 136, 137, and 138 at the lower right-hand corner of Fig. 2. By means of these keys, the platen may be rotated to effect differential line spacing. The keys are shown in detail in Figs. 11 to 14 inclusive. The key 136 has a connection with the shaft 123 which affords variation in the extent of rotation which is imparted to the shaft 123 by means of the key. The key is slidable in an arm 139 journaled on the shaft 123. At its lower end the key carries a rack 140 for meshing with a pinion 141 fast to the shaft 123. In operating the key, it is depressed against the action of spring 142 and then rocked forwardly or backwardly, according to the direction in which it is desired to rotate the platen 2.

The throw of arm 139 is regulated by a pair of adjustable stops 143 and 144 in the form of levers which are connected at their lower ends by the links 144ᵃ and 145. These levers are retained in adjusted position by a spring-pressed dog 146 on the lever 144 and which engages the fixed teeth 147. The arm 139 carries a pin 148 which projects between a pair of arms 149 and 150 loosely pivoted on the shaft 123. These arms are connected by a restoring spring 151, and their motion is limited by stop pins 152.

The manner in which the platen is removably supported in the frame 91 is illustrated in Fig. 3. The frame has vertical guideways 153 in which blocks 154 carrying the platen shaft are slidable. A rod 159 extends downwardly from each block 154 and bears against one of a pair of arms 157. The arms 157 are connected by springs 156 to rods 1551. These are adjustable by having threaded engagement with the knurled nuts 155 located between ears on the platen frame. Thus a resilient mounting for the platen is provided. To remove the platen the two upper sections 3 and 5 of the typewriter are first rocked upwardly around the pivot 160.

The paper written upon is clamped to the platen 2 by a pair of paper guide rollers 205 (Figs. 4 and 9). These rollers may be rocked away from the platen by means of the key 206 which is pivotally connected at the rear end with arms 207 supporting rollers 205. The key 206 has a pivotal connection with the platen frame structure 100 through the link 208. When the key is depressed it rocks downwardly around the pivot 209, thus causing one of the arms 207 to rock around its pivot 210, and the remaining arm 207 rocks around the slot and pin connection 211, causing the rollers 205 to move away from the platen. The front of the platen supporting frame 100 is jointed at 1001 to permit the key 206 and associated mechanism to be rocked away from the platen when it is desired to remove the latter.

The copy supporting cylinder 161 is mounted at the upper rear portion of the machine. The copy is held against this cylinder by the spring-pressed rod 162. The cylinder may be rotated as desired by the knurled head 163 or by the friction gear 164. The cylinder may be held out of engagement with this gear by forcing it to the left (Fig. 2) against the action of the spring 165, and retaining it in this position by means of the latch 166 engaging the knurled head 163. The gear 164 is rotated by a gear connection to the platen comprising the vertical shaft 165 (Fig. 3) and horizontal shaft 166 connected together by the beveled gears 167. The shaft 165 is made in two parts connected by gears 168 as shown in Fig. 3, in order not to interfere with the rocking motion of the frame section of the typewriter around the pivot 160. In order to regulate the extent of rotation imparted to the copy cylinder 161, the friction roller 164 may be shifted radially with respect to the copy cylinder by means of its threaded connection with a sleeve 169 on the upper end of the shaft 165.

A fixed alining rack 176 (Fig. 2) may be engaged by the beveled end of the manually operated key 175 mounted on the arm 67 of type basket frame 6.

For the purpose of localizing, on the writing line of the platen, a portion of the light entering the machine at its sides and above the platen, suitably cut prismatic glass panes 177 and 178 are mounted in the frame of the machine.

In Fig. 22 the typewriter is shown mounted above a flat platen 180, and a carriage is provided for the machine which permits it to be shifted to any position along the surface of the platen. This carriage comprises a rectangular frame 181, the side bars 182 of which serve as tracks along which the typewriter may be shifted forwardly or rearwardly. The tracks are engaged by rollers 183 pivoted in the frame of the typewriting machine. The frame 181 carries rollers 184 resting on horizontal tracks 185 which are fixed to the platen frame. By shifting the frame 181 along the tracks 185, any desired lateral adjustment of the typewriting machine with respect to the platen may be effected. The frame 181 is retained in any desired position along the tracks 185 by the latching pawl 186 (Fig. 25) which engages the teeth of a fixed rack 187.

Forward and rearward line spacing may be effected by the key construction shown in Fig. 23. This comprises a pair of keys 188 and 189 pivoted to the typewriting frame on stub-shaft 190. Each key carries a pawl 191 for engaging a gear wheel 192 which meshes with rack teeth 193 cut in track 182. During a portion of the down-stroke of either key, its pawl 191 may be held out of engagement with the gear 192 by flanges 194 on arms 195 pivoted on shaft 190. These arms are connected by links 196 with a vertically adjustable rod 197. The rod 197 is secured in set position by a set screw 198. According to the adjustment of the arms 195, the pawls 191 are held out of engagement with the gear 192 during the downstroke of either of the line spacing keys 188 or 189. In this manner the distance between written lines may be regulated as desired. A spring-pressed detent 211 normally prevents rotation of gear 192. This detent is disengaged when the keys 188 or 189 are depressed by arms 212 of the keys which extend below a flange 213 on the detent. It may also be disengaged by means of key 214.

In the operation of the machine, the paper to be written upon is inserted between the platen 2 and the rollers 205, the key 206 being depresed at this time (Fig. 4).

The type carriage may be adjusted to any desired position laterally of the platen by depressing key 68 (Fig. 2), to disengage it from threaded shaft 61, and then through this key the carriage may be shifted to the right or left along its guide rods 210. Upon the depression of any one of the writing keys 4, the corresponding actuating bar 24 is shifted rearwardly, due to the engagement therewith of pawl 22 which is carried by the key. During the initial rearward motion of bar 24 the shoulder 39 of block 29 carried by the bar engages pawl 37 thus rocking the key locking device 28 downwardly and causing the pawl 36 to pass to the rear of shoulders 38 on the blocks 29 on all of the remaining bars 24.

The rack 31 carried by the moved bar 24 engages pinion rod 32 rotating this rod as required to effect a lateral shift of the type basket 6 the distance of one letter space. The shifting of the type basket is effected through the gearing shown in Fig. 1, which serves to effect a partial rotation of shaft 61 (Fig. 2). This shaft, having threaded engagement with the tooth 69 (Fig. 4) communicates motion to frame 6 through the forwardly extending portion thereof. The type bar 70 corresponding to the depressed key is actuated by pawl 30 (Fig. 4) engaging bell crank lever 41, which serves to communicate motion to one of the oscillating yokes 82. The type bar 70, operatively connected to the L shaped member 77 having shoulders 81 above the yokes 82, is actuated upon the lifting of bar 77 when engaged by the yoke.

During the lateral shifting of the carriage the members 77 travel with it, their shoulders 81 always remaining above the corresponding yokes 82.

Spacing between words is effected by the depression of either of keys, 9, 11, or 12 (Fig. 1) which serve to actuate racks 31 through reciprocating bars 24 constructed the same as bars 24 which are actuated by the writing keys. The spacing between words is normally the same as that of the spaces occupied by individual characters, and the spaces effected by depressing one of the keys 4 should be the same as that caused by depressing key 9. Keys 11 and 12 are multiples of key 9 and may effect spacings of multiplied proportions of that of key 9, thus effecting twice and three times the spacing made by key 9. The spacing corresponding to any of the keys 9, 11, or 12 may be optionally adjusted to obvious conditions demanded, such as in the employment of special characters smaller or larger than the mean, such as italics or grand type or eccentric alliteration, while a further regulation of spacing, always modified by the foregoing, is effected by an increased movement of gear 61 through the modifying keys 63, which general means of modifying the mean spacing or alliteration enables type of a differing size to be used in connection with an offset shift, whereby a more or less complete stand of italics or grand type may be employed coincidentally, for use in making quotations, parentheses, headings, and set-offs.

When the carriage 6 arrives at its extreme right-hand position, the beveled portion 243 of key 68 engages the beveled end 242 of bar 241, (Fig. 1) forcing this bar rearwardly, and through this connection with the key locking device 28, locking all the writing keys against depression. The operator then either disengages key 68 from the beveled portion 242 of the bar 241, if he wishes to continue writing on the same line, or may return the carriage to the left of the machine and begin writing upon a new line. When the carriage arrives at the left of the machine, the line spacing device shown in Fig. 6 is operated. The distance between lines is determined by the adjustment of lever 113 with respect to the segment gear 116, which serves to communicate motion to the gearing for rotating the platen. Line spacing may also be effected by depressing one of the keys 136, 137, or 138 (Fig. 1), these keys, as described, being arranged to effect line spacing either forwardly or rearwardly variable extents.

The case shift is effected by pressing either of keys 108 or 110 (Fig. 4), these keys being constructed to rock the lever 97, which in turn serves to shift the platen carriage either forwardly or rearwardly.

I claim:

1. A typewriting machine, comprising a frame, a stationary platen, a type bar basket slidably mounted with respect to said platen, depressible keys supported in said frame and corresponding to the type bars in said type bar basket, connections between said keys and their respective type bars which are operative irrespective of the position of the type bar basket with respect to the keys, and a shaft rotatable in said frame and having threaded engagement with said type bar basket, and each of said keys being arranged to rotate said shaft when depressed.

2. A typewriting machine, comprising a frame, a relatively movable platen and type bar basket supported in said frame, a pinion rod rotatable in said frame and having connections for causing a relative movement between the platen and type basket, depressible keys, and a rack for each of said keys adapted to engage and rotate said pinion rod upon the depression of its respective key.

3. A typewriting machine, comprising a frame, a relatively movable platen and type basket supported in said frame, a pinion rod rotatable in said frame and having connections for causing a relative movement between the platen and type basket, depressible keys, and a rack for each of said keys adapted to engage and rotate said pinion rod upon the depression of its respective key, said racks being arranged to idly ratchet over the pinion rod on return strokes.

4. A typewriting machine, comprising a frame, a platen and type basket supported on said frame and relatively movable with respect to each other, means mounted in said frame and having connections for causing a relative movement between said platen and type basket, said connections including shiftable speed changing gears, depressible keys, and mechanism on each of said keys adapted to actuate said first-mentioned means upon the depression of its respective key.

5. A typewriting machine, comprising a frame, a relatively movable platen and type basket supported in said frame, a pinion rod rotatable in said frame and having connections for causing a relative movement between the platen and type basket, said connections including shiftable speed changing gears, depressible keys, and a rack for each of said keys adapted to engage and rotate said pinion rod upon the depression of its respective key.

6. In a typewriting machine, a plurality of longitudinally shiftable key-bars disposed in substantially parallel spaced relation, depressible keys having connections for independently actuating said key-bars, a pair of pawls extending transversely across said key-bars and disposed on respectively opposite sides thereof, a member supporting said pawls whereby they are shiftable as a unit in a plane substantially at right angles to the plane of said bars, a lug formed on one side of each of said bars, a shoulder formed on the opposite side of each of said bars, said shoulder being adapted to engage the respective pawl during the initial movement of any of said key-bars and actuate said member whereby said other pawl is caused to shift into position to engage the lugs on the remaining key-bars so that said remaining key-bars are temporarily locked against longitudinal shifting.

7. In a typewriting machine, depressible writing keys, a stationary platen, a type-carrier support shiftable with respect to the platen, type carriers movably mounted in said support, an actuating arm attached to each type carrier and extending outwardly from the support, a plurality of oscillating yokes extending across said arms, members for oscillating said yokes, a plurality of longitudinally shiftable key-bars disposed in substantially parallel spaced relation, bell crank levers connecting said key-bars with said keys whereby said bars are independently shiftable by the depression of the respective keys, pawls mounted on said bars and adapted to be shifted into engagement with said members by the depression of said keys whereby said oscillating yokes are rocked into engagement with said arms for actuating said type carriers, and feed mechanism for causing a step-by-step movement of said type carrier support.

8. A typewriting machine, having a frame structure comprising three separable parts arranged one above the other, the upper part supporting writing keys and the remaining two parts of the frame respectively supporting a traveling type supporting carriage and a stationary platen, and type operating connections between said keys and the traveling carriage.

9. A typewriting machine, comprising a frame, a stationary platen, a type-bar basket mounted on said frame, depressible keys having connections for operating the type-bars in said basket, said frame having an opening formed therein adjacent each end of said platen, and a prismatic glass member supported in each of said openings for focusing light on the writing line of said platen.

10. A typewriting machine, comprising a frame, a stationary platen rotatably mounted therein, a type-bar basket slidably mounted with respect to said platen, depressible keys supported in said frame and having connections for operating the type-bars in said basket, a gear rigidly mounted on one end of said platen, mechanism engaging said gear and adapted to be actuated for rotating said platen, a lever arm pivotally mounted at one end of said frame and having connections whereby the oscillation of said lever arm actuates said mechanism, means on said type-bar basket adapted to engage and oscillate said lever arm when said basket is shifted to its initial position, whereby said mechanisms is caused to rotate said platen.

11. A typewriting machine, comprising a frame, a type-bar basket mounted in said frame, depressible keys supported in said frame and having connections for operating the type-bars in said basket, each of said type-bars having three units of type mounted on the outer end thereof, a yoke-shape platen carriage adjustably mounted on said frame and having a platen rotatably mounted thereon, a spring normally urging said platen into position to be engaged by the center type on each of said type-bars, and means for urging said platen and carriage in opposite directions against the action of said spring whereby said platen is shifted into position to be engaged by the inner and outer type respectively on each of said bars.

Signed at Chicago this 3rd day of June, 1918.

EDWARDS B. STUART.